Sept. 3, 1929.    D. F. GRAHAM    1,727,309
DEMOUNTABLE WHEEL RIM
Filed July 14, 1928    5 Sheets-Sheet 1

INVENTOR
David F. Graham
By H. W. Williamson
Atty.

Sept. 3, 1929.    D. F. GRAHAM    1,727,309
DEMOUNTABLE WHEEL RIM
Filed July 14, 1928    5 Sheets-Sheet 2
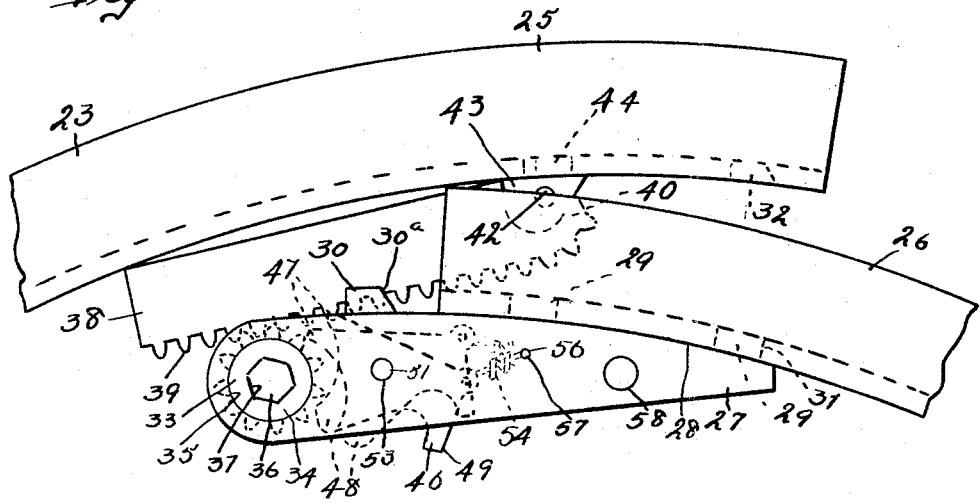
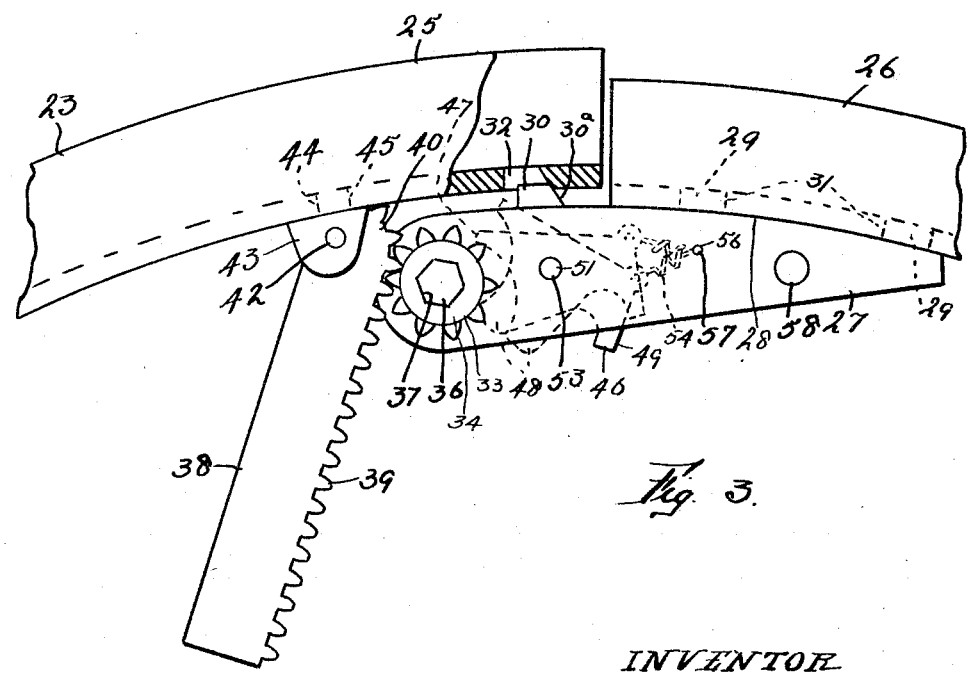
INVENTOR
David F. Graham
By H. W. Williamson
Atty.

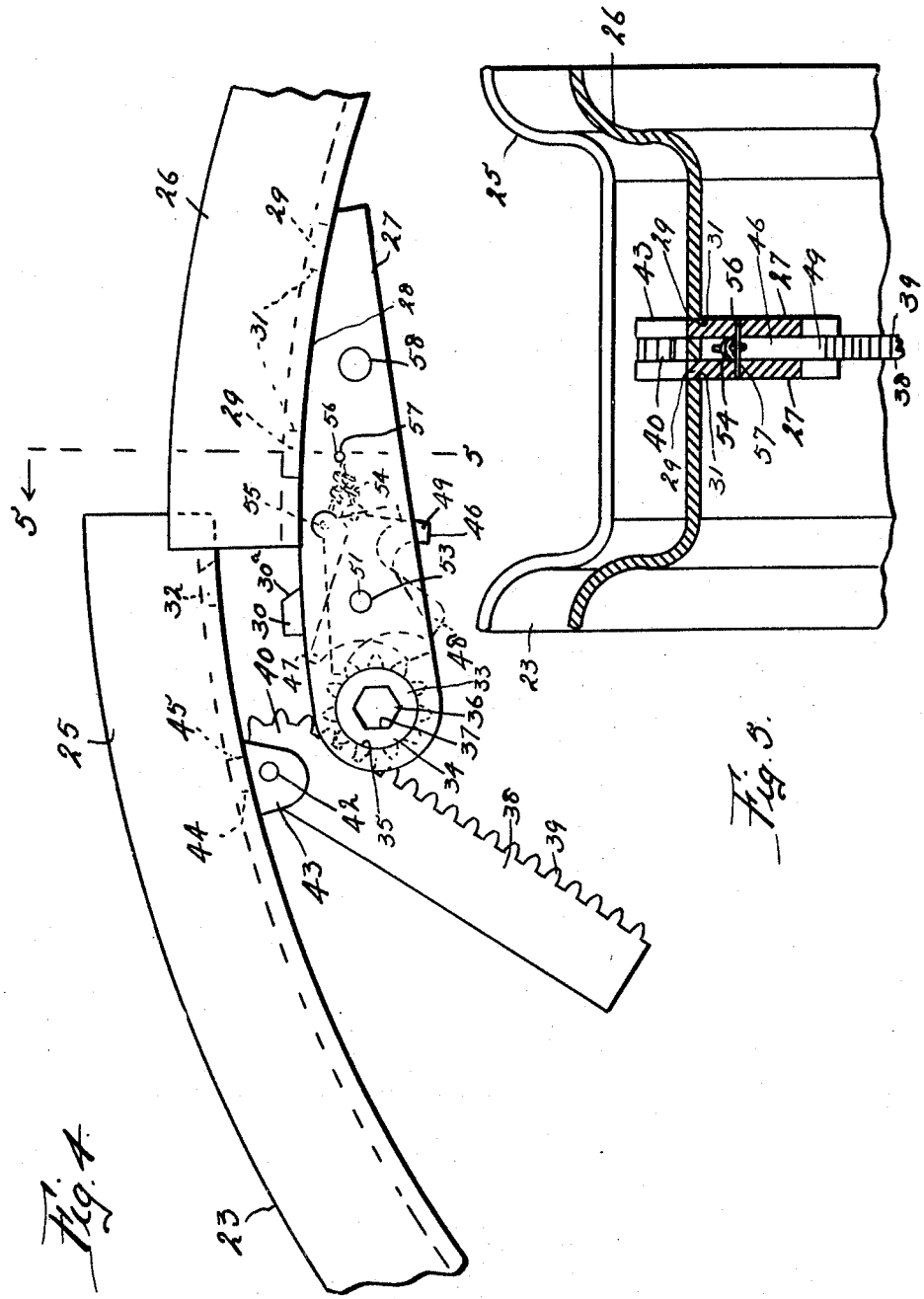

Sept. 3, 1929.   D. F. GRAHAM   1,727,309
DEMOUNTABLE WHEEL RIM
Filed July 14, 1928   5 Sheets-Sheet 4

INVENTOR
David F. Graham
By W. W. Williamson
Atty.

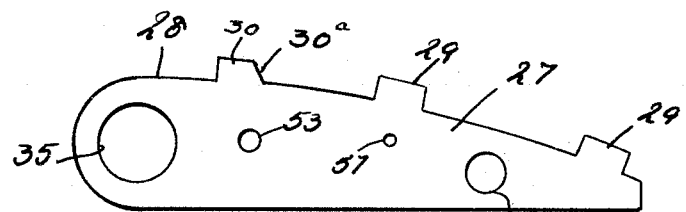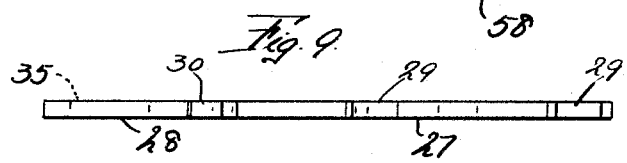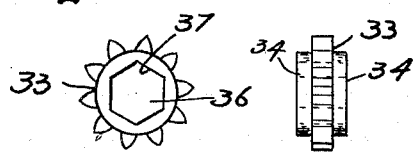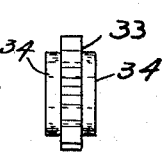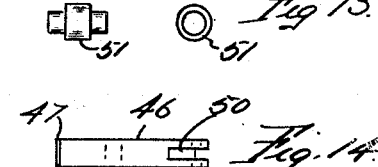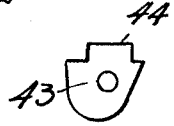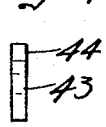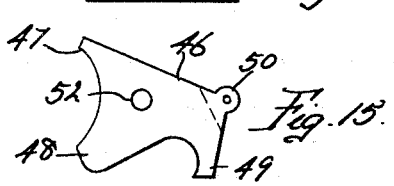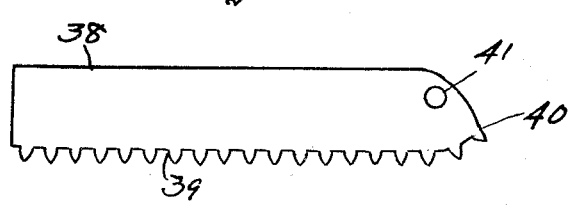

Patented Sept. 3, 1929.

1,727,309

UNITED STATES PATENT OFFICE.

DAVID F. GRAHAM, OF DETROIT, MICHIGAN.

DEMOUNTABLE WHEEL RIM.

Application filed July 14, 1928. Serial No. 292,790.

My invention relates to new and useful improvements in a demountable rim and has for one of its objects to provide novel and improved means for contracting and expanding the rim to facilitate the removal and application of the tire.

A principal object of my invention is to provide a rack pivoted at one end adjacent one of the meeting ends of the split rim so that when the pinion, carried by the other meeting end of the rim and meshing with the rack, is revolved in the proper direction for contracting the rim, said rack will first be tilted and that the resulting action will force the rack carrying end of the rim outward away from the other end, and thereafter, the rack will return to its normal position in contact with the rim so that the rack carrying end thereof will be moved over the other end in overlapping relation.

One of the objects of this invention is to provide a rack and pinion mechanism connected to the meeting ends of a split rim whereby the ends will be moved away from each other tangentially, next separated radially and then moved back into overlapping relation for contraction of the rim while a reverse action will occur when the rim is expanded.

Another object of the invention is to provide an improved double ratchet or pawl for co-operation with the pinion to permit step-by-step rotation of the latter during contracting operations and preventing retrograde movement thereof, and also to hold the rim ends in alignment until the rim is placed on a wheel.

Another object of the invention is to so mount the ratchet or pawl that when the rim with its tire are placed on a wheel, the ratchet will be automatically set to permit contraction of the rim as soon as again removed from the wheel.

Another object of the invention is to provide a unique method of temporarily maintaining the ratchet in either of its operative positions.

Another object of the invention is to so construct the parts that the ends of the split rim will be held in absolute alignment even until the tire is placed thereon and inflated without the use of a pin or latch independent of the parts for contracting and expanding the rim.

A still further object of the invention is to so construct the parts that the majority, but not all, of them may be produced from stampings.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings, forming a part of this application, in which:

Fig. 2, is a fragmentary side elevation of the demountable wheel rim illustrating the positions the parts assume when the rim is fully contracted with the ratchet holding them in such positions.

Fig. 3, is a similar view of the meeting ends of the rim showing them in the positions they assume at the beginning of the contracting or the end of the expanding operations.

Fig. 4, is also a fragmentary side elevation of the meeting ends of the rim showing them in an intermediate position.

Fig. 5, is a section on the line 5—5 of Fig. 4.

Fig. 8, is a face view of one of the pinion and ratchet supports.

Fig. 9, is an edge view thereof.

Fig. 10, is an end view of the pinion.

Fig. 11, is an edge view thereof.

Fig. 12, is a side elevation of the ratchet or pawl axle.

Fig. 13, is an end view thereof.

Fig. 14, is an edge view of the pawl or ratchet.

Fig. 15, is a face view of the same.

Fig. 16, is a face view of one of the supports for the tilting rack.

Fig. 17, is an edge view thereof.

Fig. 18, is a face view of the tilting rack.

Fig. 19, is an outer end view thereof.

Figure 1:
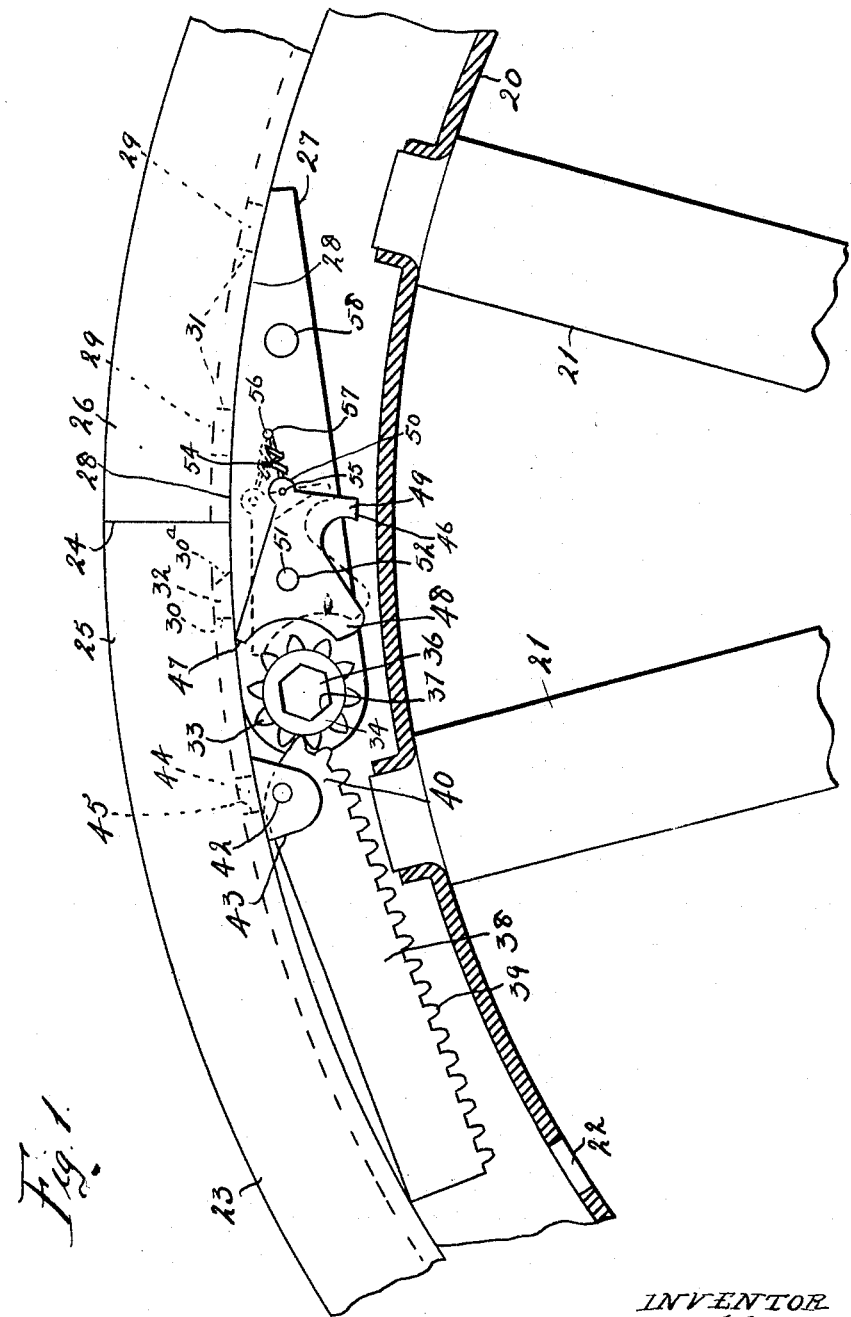
Fig. 1, is a fragmentary longitudinal sectional view of a conventional wheel showing a rim thereon constructed in accordance with my invention which is shown in elevation, and the near side hanger removed.
Figure 6:
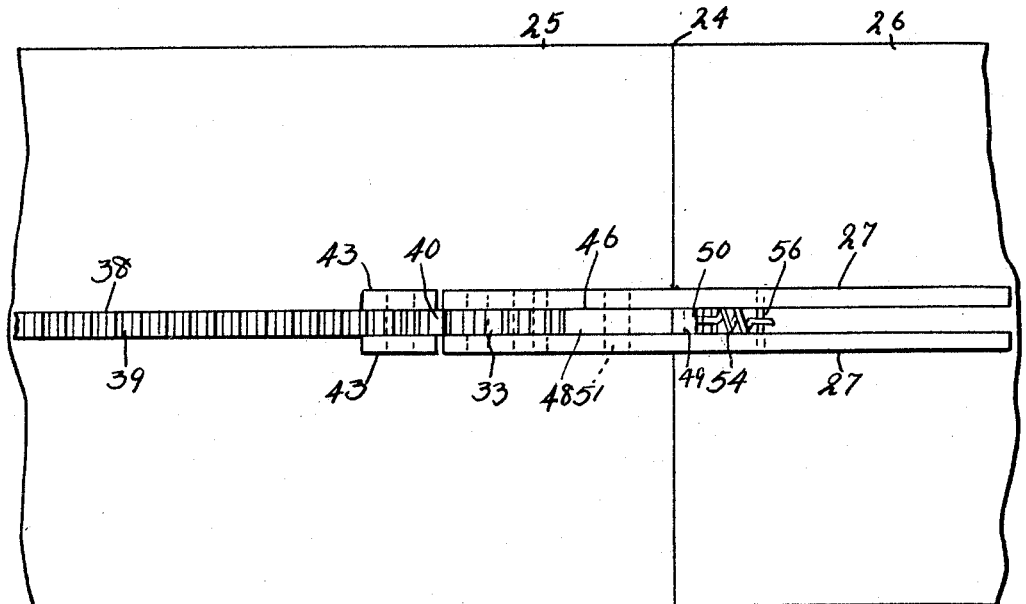
Fig. 6, is a fragmentary inner face view of the rim.
Figure 7:
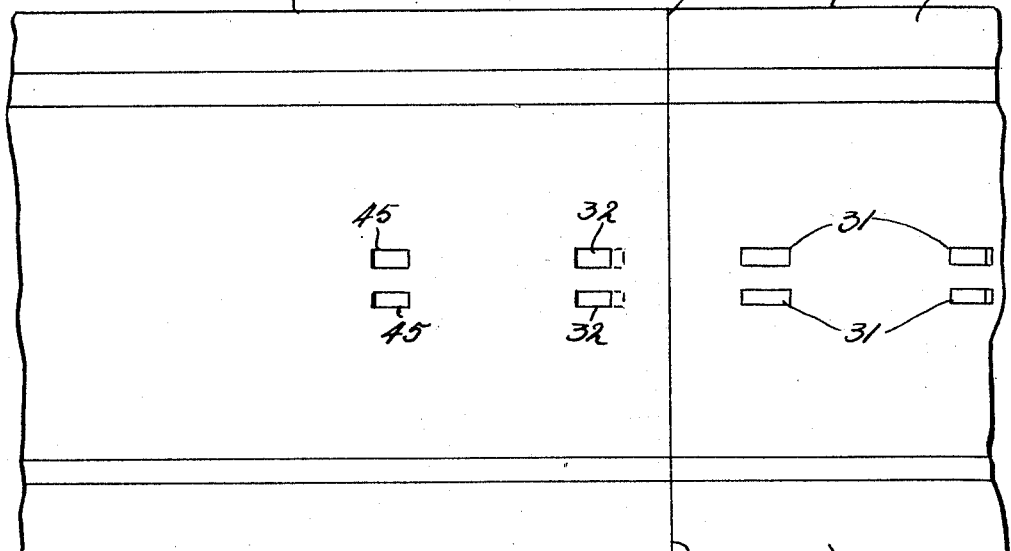
Fig. 7, is an outer face view of the meeting ends of the rim.

In carrying out my invention as herein embodied, 20 represents a portion of a felloe connected in the usual manner with the ends of spokes 21 and having a tire valve hole 22 through it. The felloe may be of any desirable construction which will permit the removal or replacement of the demountable rim.

On the felloe is mounted, when in use, the tire carrying and demountable rim 23 which is of the usual split or divided form with its meeting ends or terminals abutting end to end, as indicated at 24.

For convenience of later description, the rim ends of the demountable rim will be referred to as 25 and 26. To one of these ends, as 26, are secured the hangers 27 in parallel spaced relation longitudinally of the rim with the outer ends of said hangers projecting beyond the terminal of said rim end 26.

Each hanger comprises a flat strip of metal fashioned to provide an arcuate edge 28 corresponding to the curvature of the rim and from this arcuate edge project a number of lugs, two of which are indicated by the numeral 29 and another by the numeral 30. The lugs 29 pass through apertures 31 in the end 26 of the rim and are then headed or otherwise secured in said apertures to fasten the hanger in place, while the other lug 30, which has a beveled edge 30 facing the terminal of rim end 26, is adapted to register with an aperture 32 in the other end 25 of the rim for temporarily connecting the hanger with said other end of the rim and prevent transverse movement of the rim ends relative to each other after the rim is fully expanded.

As before stated, two of these hangers are mounted in parallelism and between their forward or outer ends is located the pinion 33, the trunnions 34 of which are journalled in bearing holes 35 in the hangers.

The pinion and its trunnions are provided with a bore 36 running entirely therethrough to facilitate the removal of mud, dirt, or other foreign matter from the polygonal socket 37 formed by broaching one end of the pinion or more particularly one of the trunnions into hexagon or other desirable shape.

The pinion 33 meshes with a tilting rack 38 which is pivoted at one end to the other rim end 25, but considerably back from the terminal of said rim end 25. This rack is preferably formed from a flat strip of metal and includes the ordinary rack teeth 39 and a segmental gear end 40, the teeth of which are eccentric with the rack bearing or pivot point formed by the hole 41 at the forward or outer end of the rack. Said rack is pivoted by means of a pin 42 between a pair of coacting brackets 43, each of which is formed from a flat piece of metal fashioned to provide a lug 44 which is mounted in one of the apertures 45 in the rim end 25. Since the rack is connected with the rim at only one end by means of the pivotal mounting, the other end of said rack is free to swing about its pivot point, within certain limits, for tilting the rack, but normally when the rim is fully expanded or in operative condition as well as when fully contracted, the free end of said rack is in contact with the inner face of the rim as shown in Figs. 1 and 2.

In order to prevent retrograde movement of the pinion when the rim is being contracted and to lock the rim in its fully expanded or operative position, I provide a double ratchet or pawl 46 which may also be formed from a flat piece of metal fashioned to provide a nose 47, a secondary nose 48, a tail 49 and a bifurcated bearing 50. This ratchet or pawl is mounted between the hangers 27 on a rivet 51, or its equivalent, which passes through the hole 52 in the ratchet and into holes 53 in the hangers. In the bifurcated bearing is mounted one end of a coil spring 54 where it may be held by a pin 55 while the other end is connected with a rivet 56 mounted in holes 57 in the hangers. It is to be understood that the spring 54 is under compression and the connections are so located that when the bifurcated bearing of the ratchet is on one side of an imaginary line running through the centers of the rivets 51 and 56, the nose 47 is in engagement with the pinion 33, but when said bifurcated bearing is on the other side of said imaginary line, the secondary nose 48 of the ratchet will be in engagement with the pinion.

In some demountable rims, a bolt of one of the rim retaining lugs is positioned in the region of the location of this device in which case holes 58 may be provided in the hangers for the passage of such a bolt.

Assuming the rim to be in a closed position as shown in Fig. 1 but removed from the wheel, and it is desired to mount a tire on said rim, then a tool, such as a hexagon ratchet wrench handle, is placed in the socket 37 of the pinion 33, and said pinion revolved clockwise so that the initial movement will rotate the segmental gear 40 and tilt the rack to an angular position similar to that shown in Fig. 3.

This tilting of the rack due to the rotation of said segmental gear 40, which is journalled eccentrically, increases the distance between the axes of the rack and pinion, thus separating the meeting ends 25 and 26 of the rim tangentially, as shown in Fig. 3, and the continued revolving of the pinion tends to push the end 25 of the rim outward and the end 26 of the rim inward away from each other in a radial direction until the rim ends are separated sufficiently to allow the end 26 to pass inside of the other end, as illustrated in Fig. 4.

At the moment when the ends of the rims are in such positions that they can pass one another, the rack will snap back into its normal position as shown in Fig. 2 and thereafter the continued revolving of the pinion will cause the rim to be completely contracted as will be obvious by reference to Fig. 2. This contracting of the demountable rim decreases the diameter thereof to such an extent that it may be readily placed within or removed from a tire. During the above operations, the secondary nose 48 of the ratchet 46 is in engagement with the pinion 33 to prevent retrograde movement thereof should it be necessary to stop revolving the pinion or should the operator momentarily relax pressure on the operating means.

After the rim has been placed inside of the tire, the ratchet is reversed by pushing on its tail until the nose 47 is moved into engagement with the pinion. During the reversing of the ratchet, the rim will expand to some degree and thereafter the pinion is revolved counter-clockwise which will reverse the above described movements and cause the two ends of the rim to properly align at which time the end 25 will engage the projecting ends of the hangers 27 and the lug 30 will register with the aperture 32. As the pinion cannot be revolved clockwise because of the engagement of the nose 47 therewith, the rim ends are securely locked in true alignment without the use of additional pins or latches and since the lug 30 is in registration with the aperture 32, no transverse movement relative to each other can take place.

The tire can now be inflated without in any way affecting the alignment of the rim ends.

The tire with the demountable rim thereon is now in condition to be placed upon the wheel and the ratchet is in the position shown in dotted lines in Fig. 1. It being necessary to first insert the tire inflating valve through the hole 22 in mounting the tire upon the wheel, the meeting ends of the rim will be located adjacent the hole 22 so that as soon as this side of the rim approaches its operative position upon the wheel or said rim contacts with the wheel felloe, the secondary nose 48 of the ratchet will engage or come into contact with the inner wall of the felloe and give a sufficient initial movement to the ratchet to cause its associated spring to move said ratchet to the position shown in full lines in Fig. 1, so that the next time the demountable rim is removed from the wheel, the parts are all ready to begin operations for contracting the rim.

I desire to call particular attention to the action that takes place due to the eccentrically pivoted tilting rack in combination with the double ratchet or pawl. These parts permit or cause a triple controlled movement of the rim ends when the rim is contracted as well as when it is expanded. During contraction, the rim ends first move tangentially and then radially away from each other, and finally curvilinearly relative to each other and during all these movements the parts are automatically held against retrograde action by the ratchet.

During expansion, the movements of the parts are reversed and at the end of said reverse movements, the parts are held in the normal expanded position by said ratchet.

This is very important because the rim ends are held in all intermediate positions, thus preventing them from flying back and possibly injuring the operator, and the securement of the parts at the end of the expansion movements by the ratchet, eliminates the necessity of using additional fastenings, such as pins and latches.

Of course I do not wish to be limited to the exact details of construction as herein shown, as these may be varied within the limits of the appended claims without departing from the spirit of my invention.

Having thus fully described my invention, what I claim as new and useful is:—

1. In a demountable wheel rim, a split rim having meeting ends for movement relative to each other during expansion and contraction of the rim, a pinion carried by one of the rim ends and a rack pivoted at one end to the other rim end and coacting with said pinion.

2. The combination with a split rim, of a rack pivoted at one end adjacent one end of the split rim, and means supported by the other end of the split rim and coacting with the rack to cause the ends of said rim through the swinging of the rack to move radially and curvilinearly relative to each other.

3. In a device of the character stated, a split rim, a rack having a segmental gear end, means to pivot said rack at its segmental gear end adjacent one end of the split rim, and ratchet controlled means supported by the other rim end and coacting with the rack to cause the latter to tilt at an angle to the rim for moving the ends radially relative to each other, and when said rack is in a longitudinal position relative to the rim, to cause said rim end to move curvilinearly relative to each other and also hold said ends in alignment.

4. In a demountable wheel rim, a split rim, a rack pivotally connected with one of the rim ends whereby it may assume a position longitudinal of the rim or another position at an angle thereto, a pinion rotatably supported by the other rim end and coacting with the rack whereby the revolving of the pinion will move the pivot point of the rack to a position relative to the pinion axis that will tilt the rack to the angular position and cause the ends of the rim to move radially relative to each other and when the pivot point is moved to another position relative to the axis of the pinion, said rack will assume the longitudinal position for moving the rim ends curvilinearly and when the pivot point is in a third position relative to the pinion, the rim ends will be held in alignment.

5. A device of the kind described comprising a split rim, a rack provided with a segmental gear end, means to pivot said rack at the segmental gear end to one of the rim ends on the inner face inside of the terminal, a ratchet controlled pinion for coaction with the rack, and means to support said pinion a distance beyond the other rim end whereby revolving of the pinion will move the rack about its pivot point and cause the rim ends to travel radially relative to each other when the meeting ends of the rim are abutting and curvilinearly while separated.

6. In a device of the character stated, a split demountable rim, a rack having one end pivoted to one of the rim ends some distance from the terminal thereof, pinion supporting means carried by the other end of the rim and projecting beyond said end to act as a stop for the first-mentioned rim end, a pinion journalled in said supporting means and coacting with the rack whereby revolving of the pinion will move the rack about its pivot point and cause the rim ends to move radially and curvilinearly relative to each other.

7. The structure set forth in claim 6 in combination with a spring actuated double pawl for coaction with the pinion when revolved in either direction.

8. In a device of the character stated, a split rim, a pair of brackets fixed to one end of said rim in spaced relation, a rack pivoted at one end between said brackets so as to swing relative to the rim, a pair of supports carried by the other rim end, a pinion journalled between said supports and coacting with the rack whereby the revolving thereof will move the rack on its pivot and cause the rim ends to travel some distance radially and another distance curvilinearly.

9. The structure set forth in claim 8, in combination with a ratchet having a primary nose and a secondary nose, said ratchet being pivoted between the supports whereby either nose may selectively coact with the pinion, and means to resiliently hold said ratchet in either one of two positions.

10. In a device of this character, a split rim having a plurality of apertures in both of the meeting ends, a pair of brackets provided with lugs mounted in two of the apertures of one of the rim ends whereby said brackets are in parallel spaced relation, a rack provided with a segmental gear end pivotally mounted at the segmental gear end between said brackets so that the opposite end may swing to and from the rim, a pair of supports provided with a plurality of spaced lugs, certain of which register with the apertures in the other rim end for mounting said supports thereon and others of said lugs adapted to register with the other apertures in first-mentioned rim ends when the rim ends are in alignment, a pinion journalled between the supports and coacting with the rack causing it to move to and from the rim as the axial centers of said rack and pinion assume different relative positions, the swinging of the rack away from the rim, causing the rim ends to move radially and the swinging of said rack toward or against the rim causing the rim ends to move curvilinearly, and a spring actuated double nose ratchet coacting with the pinion to hold the parts in different adjusted positions.

11. The combination with the split rim, of a rack pivoted to the inside adjacent one end for swinging movement to and from the rim, a pinion support carried by the other end of the rim and projecting beyond the end to which it is attached to act as a stop for the first-mentioned rim end, a pinion journalled in pinion support and coacting with the rack and causing it to move to and from the rim as the axial centers of said rack pinion assume different relative positions, the swinging of the rack away from the rim causing the rim ends to move radially and the swinging of said rack toward or against the rim causing the rim ends to move curvilinearly, means to hold the pinion in different adjusted positions, and means on the support beyond the rim end to which said support is attached for registration with apertures in the first-mentioned rim end.

12. The structure set forth in claim 11 wherein the pinion controlling means has a portion for coaction with a wheel when the rim is mounted on said wheel to move the controlling means into a position whereby the pinion may be revolved for contracting the rim upon removal from the wheel.

13. The combination with a split rim, of means on opposite meeting ends whereby when one of said means is actuated, the other means causes the rim ends to separate tangentially and then radially and finally move curvilinearly relative to each other.

14. In a demountable wheel rim, a split rim having meeting ends for movement relative to each other during expansion and contraction of the rim, a pinion carried by one of the rim ends, and a rack including a segmental gear at one end and by which end said rack is pivoted to the other rim end with the segmental gear eccentric, said rack and pinion co-operating to move the rim ends tangentially, radially and curvilinearly relative to each other.

15. The combination with a split rim, of a rack pivoted at one end to one of the rim ends, said rack at its pivoted end having an eccentric segmental gear portion, and means supported by the other rim end, and coacting with the rack to cause the ends of said rim, through the eccentricity of its segmental gear portion and the swinging of said rack, to move tangentially, radially and curvilinearly relative to each other.

16. A device of the kind described comprising a split rim, a rack provided with a segmental gear end, means to pivot said rack at the segmental gear end to one of the rim ends so that said segmental gear end is eccentric, a ratchet controlled pinion for coaction with the rack, and means to support said pinion a distance beyond the other rim end, whereby revolving of the pinion will move the rack about its pivot point and cause the rim ends to separate tangentially and then radially and finally curvilinearly while separated.

17. A demountable wheel rim comprising a split rim, a rack including a segmental gear portion, eccentrically pivoted at the segmental gear end to one end of the rim inside of the terminal, pinion supporting means carried by the other rim end, a pinion journalled in said supporting means beyond the terminal of said other rim end and coacting with the rack so that when revolved in the proper direction, the rim ends will be parted due to the eccentricity of the segmental gear portion and at the same time swing said rack about its pivot point to thereafter cause the ends of the rim to be separated, said rack finally swinging back to its normal position to cause the rim ends to move curvilinearly and a double nose paw to prevent retrograde movement of the pinion and thus hold the rim ends in alignment when finally brought into abutting relation.

In testimony whereof, I have hereunto affixed my signature.

DAVID F. GRAHAM.